Figure 4:
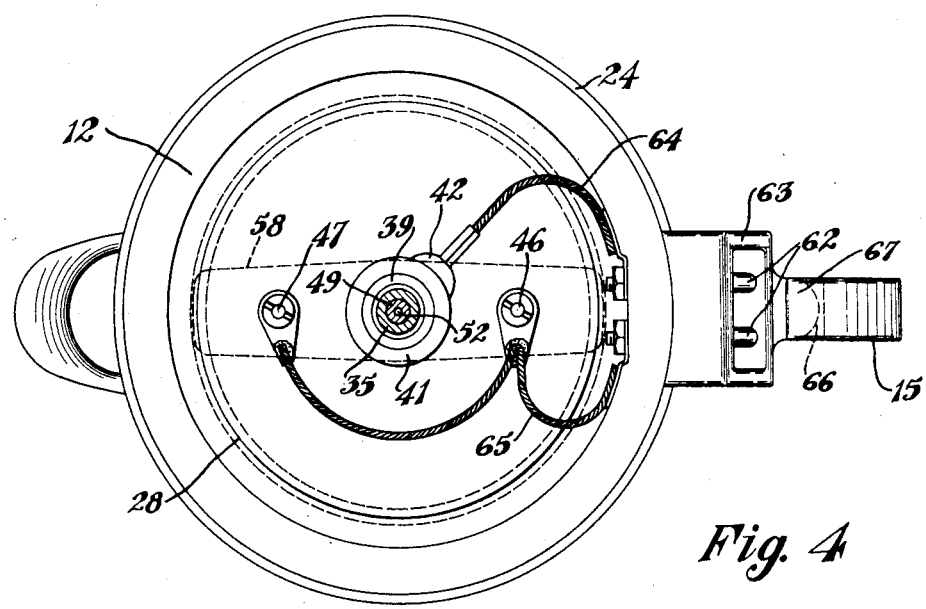

Jan. 10, 1939.　　　　　　　A. C. WILCOX　　　　　　2,143,046
AUTOMATIC ELECTRIC DRIP COFFEE MAKER
Filed July 28, 1936　　　2 Sheets-Sheet 1
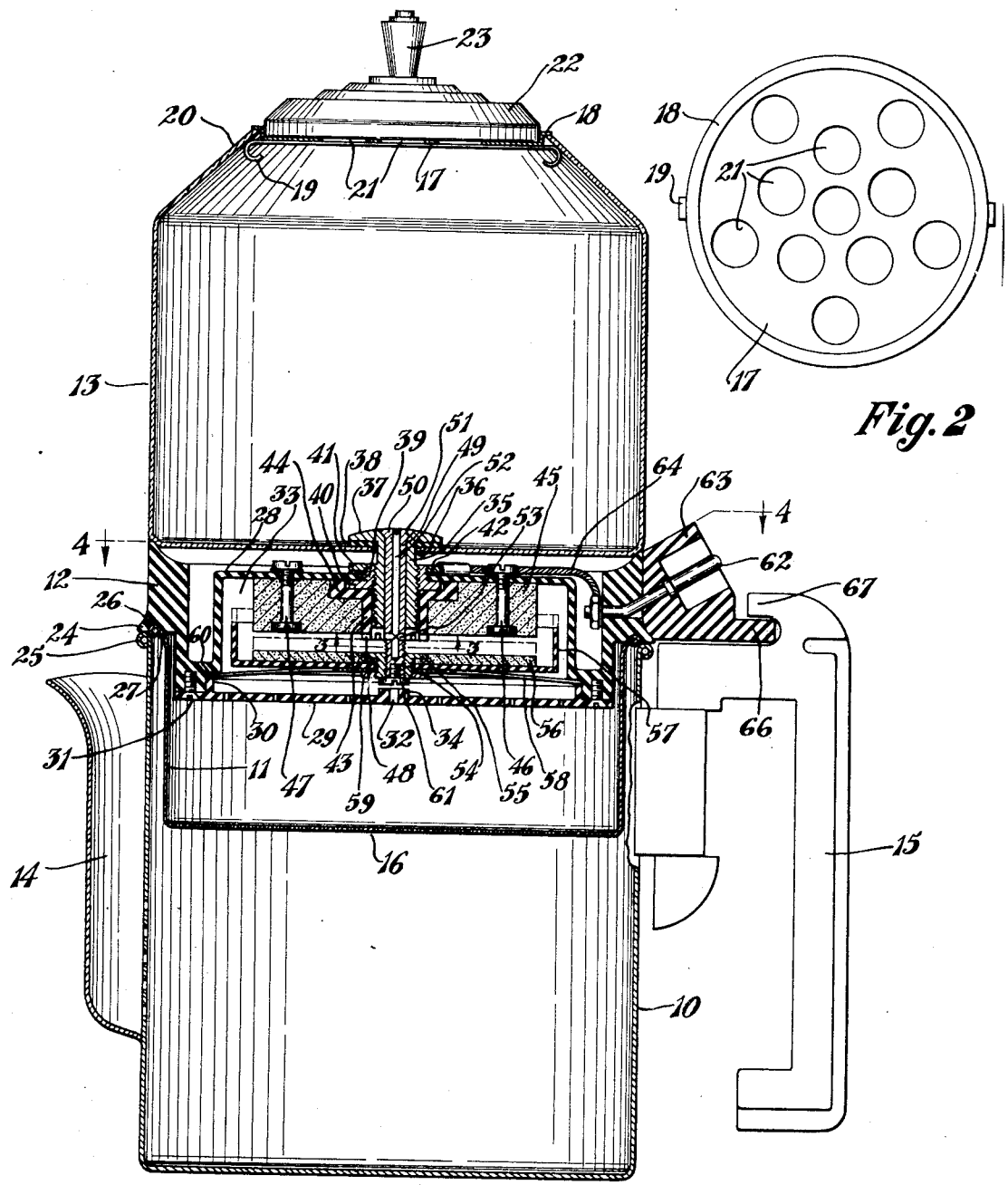
Fig. 2
Fig. 1
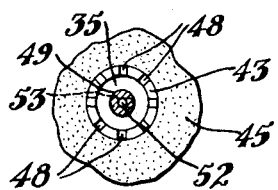
Fig. 3
Inventor
Albert C. Wilcox
By Frease and Bishop
Attorneys Inventor
Albert C. Wilcox Patented Jan. 10, 1939

2,143,046

UNITED STATES PATENT OFFICE 2,143,046

AUTOMATIC ELECTRIC DRIP COFFEE MAKER

Albert C. Wilcox, Monaca, Pa.

Application July 28, 1936, Serial No. 93,027

24 Claims. (Cl. 219—44)

The invention relates to drip coffee makers and more particularly to an automatic electric apparatus for making drip coffee so constructed that drip coffee may be easily and properly brewed therein by placing in the apparatus the desired amount of ground coffee and then pouring cold water into the apparatus, the water being automatically heated and passed through the ground coffee at the proper temperature to produce the best coffee beverage.

In the making of drip coffee it is desirable that the water as it is passed through the ground coffee be held at a substantially constant temperature within the range of approximately 192 to 198 degrees Fahrenheit.

With the type of drip coffee makers now in general use it is very difficult, if not impossible, to hold the water within the desired temperature range as it passes through the ground coffee because of the fact that the water is heated by separate means such as a gas or electric range and is then poured into the water container of the coffee maker. This results in initially considerably reducing the temperature of the water as it contacts with the walls of the water receptacle which are usually comparatively cool. As it requires from five to ten minutes for the water to seep through the ground coffee, there is a considerable further loss of temperature of the water by radiation.

Thus, even though the water be heated to the boiling point before it is poured into the water receptacle of the ordinary drip coffee maker, it is found that only the first of the water which passes through the ground coffee is likely to have a temperature within the desired range, the remainder of the water usually being of entirely too low a temperature to make good coffee.

The invention contemplates the provision of an improved coffee maker arranged to continually heat the water gravitating from the water receptacle as it passes to the ground coffee so that every drop of the water that reaches the ground coffee will be heated substantially to the desired uniform temperature.

A further object of the invention is to provide suitable heating means which is automatically turned on when the water is poured into the water receptacle and is automatically turned off when all of the water has dripped from the water receptacle to the ground coffee.

A still further object of the invention is the provision of an improved heating element for drip coffee makers and the like.

The water in different parts of the country is of different chemical composition, and it has been found that an open contact heating element set to properly heat water from one location frequently cannot be satisfactorily used with water from some other location as the water will heat either too rapidly or too slowly.

The invention therefore contemplates the provision of an open contact heating element comprising two spaced electrodes or elements with means for relatively adjusting the same so as to provide for properly heating the water from various localities.

Another object of the improvement is to provide means for preventing the user from coming into contact with the water in the water receptacle while the electric heating means is operative.

The above objects, together with others which will be apparent from the drawings and following description, or which may be later referred to, may be attained by constructing the improved coffee maker in the manner illustrated in the accompanying drawings, in which—

Figure 5:
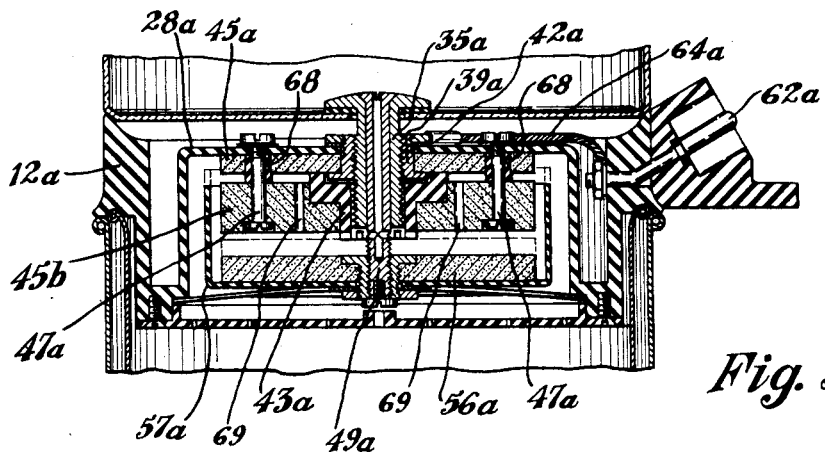
Figure 6:
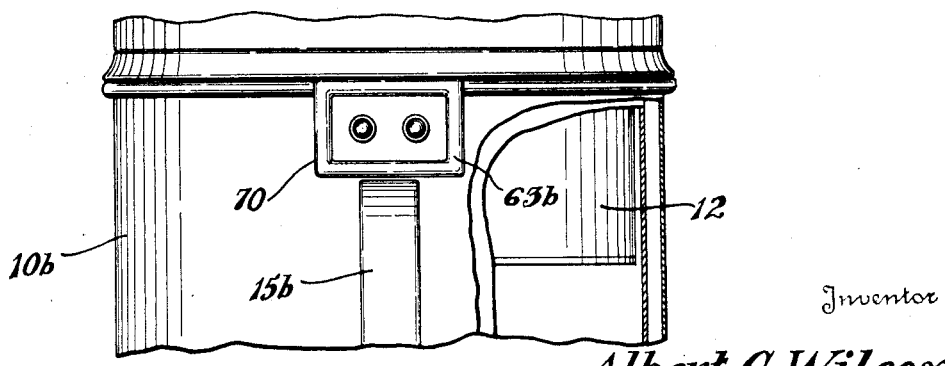

Figure 1 is a vertical sectional view of an automatic electric drip coffee maker embodying the invention;

Fig. 2, a plan view of the perforate guard plate at the top of the water receptacle to prevent the user from contacting the water in the receptacle;

Fig. 3, a fragmentary sectional view taken as on the line 3—3, Fig. 1;

Fig. 4, a section taken as on the line 4—4, Fig. 1;

Fig. 5, a fragmentary vertical sectional view showing a modified form of heating element; and Fig. 6, a fragmentary elevation of a modified form of drip coffee maker.

Similar numerals refer to similar parts throughout the drawings.

The improved drip coffee maker comprises generally the coffee beverage container or pot 10, the ground coffee basket 11 mounted in the upper end of the pot, heating means carried by the insulation shell 12 and interposed between the ground coffee basket and the water reservoir or receptacle indicated generally at 13 and preferably formed of glass or other suitable insulation material.

The pot may be provided with the usual spout 14 and with the diametrically opposed handle 15. The bottom wall 16 of the coffee basket is perforated as in usual practice.

For the purpose of preventing the user from inserting his hand into the water reservoir or receptacle 13, a guard plate 17, preferably of bakelite or other suitable insulation material, is located in the upper open end of said receptacle and provided with an offset angular flange 18 adapted to rest upon the upper edge of the water receptacle. A spring clip 19 is connected to the underside of the guard plate for engagement with the inwardly tapered upper walls 20 of the water receptacle to retain the guard plate in position. A plurality of large openings 21 is provided in the guard plate so that the cold water may be poured directly through the same to fill the water reservoir or receptacle. The cover or lid 22 for the water receptacle is adapted to fit within the offset angular flange 18 of the guard plate and is of such diameter that it will fall through the upper open end of the water receptacle unless the guard plate is in position thereon.

This guard plate is provided as a precaution to prevent the user from getting an electric shock by inserting the hand through the upper open end of the water receptacle and into contact with the water therein which is electrically charged owing to the open contact heating elements which will be later described. The usual knob 23 may be provided upon the lid or cover for easily handling the same.

The heating means is located within the insulation shell 12 which may be formed of Bakelite or any other suitable insulation material. This shell has the peripheral projection 24 which rests upon the rim bead or flange 25 at the upper open end of the pot 10, and may be provided with an annular groove 26 to receive the rim bead or flange 27 which is formed at the upper open end of the coffee basket 11 and rests upon the rim bead or flange 25 of the pot.

The insulation shell 12 includes the integral inverted cup-shaped portion 28 which contains the heating means and which is closed at its lower end as by the perforated insulation spreader plate 29 having the annular flange 30 spaced from its periphery and fitting within the open mouth of the cup-shaped portion, screws 31 or the like being provided for attaching said spreader plate to the shell 12.

A port 32 is preferably provided in the spreader plate to relieve steam pressure within the heating chamber 33 and is preferably surrounded by a raised projection or boss 34 so that the water passing from the water reservoir or receptacle 13 through the heating element may be discharged through the perforations of the spreader plate without forming a water seal over said port 32. Although this steam pressure relief port is shown located in the center of the spreader plate, it should be understood that it may be placed at any position excepting at a point near the periphery of the spreader plate and in the path of the water dripping from the heating element.

A hollow screw or stud 35 is located through the central opening 36 in the bottom of the water receptacle or reservoir 13 and provided with a flanged head 37 between which and the bottom wall of the water receptacle is preferably located a rubber gasket 38. The bottom of the glass water reservoir or receptacle may be etched or otherwise provided with an opaque finish so that the mechanism of the heating element will not be visible therethrough.

A hollow internally threaded stud 39 is threaded upon the screw or stud 35 and provided at its lower end with a peripheral flange 40 engaging the underside of the inverted cup-shaped portion 28 of the insulation shell, a nut 41 which may be of brass, stainless steel or the like, being screwed upon the upper end of the stud 39 to clamp the electric terminal 42 between said nut and the top of the cup-shaped portion 28 of the insulation shell.

An insulation bushing 43 surrounds the lower portion of the stud 35 and is provided with the offset flanged portion 44 surrounding the flange 40 upon the hollow stud 39. The upper or stationary element 45, which is formed of carbon or other suitable material, is in the form of a thick disk having a central opening fitting the insulation bushing 43, and is held in position against the top wall of the cup-shaped portion 28 of the insulation shell as by the binding screws or bolts 46 and 47 which may be located diametrically opposite to each other as illustrated.

As best shown in Fig. 1 of the drawings, the lower end of the insulation bushing 43 extends below the bottom of the upper element 45, and is provided with a plurality of radial grooves 48, as shown in Figs. 1 and 3.

The adjusting screw 49 is swiveled within the central opening of the hollow stud 35 and provided at its upper end with a tapered head 50 fitting within a similarly tapered countersunk opening 51 in the flanged head 37 of the stud. This adjusting screw is provided with a central bore 52 extending from the top to a point spaced from the lower end thereof and communicating with a transversely disposed port 53 which is located just below the bottom of the upper element 45.

A hollow internally and externally threaded stud 54, of stainless steel or the like, is threaded upon the lower threaded end of the adjusting screw 49 and provided at its upper end with a peripheral flange 55. The lower or adjustable element 56, which may be in the form of a carbon disk having a central aperture to receive the stud 54, and the flange 55 thereof, is placed upon said stud and the insulation cup 57 of Bakelite, porcelain or other suitable insulation material is placed upon the stud directly beneath the element 56.

A leaf spring 58 is then placed upon the stud and the three parts are clamped together as by the nut 59 of stainless steel or the like. The ends of the spring 58 are engaged beneath the peripheral shoulder 60 of the insulation shell 12, thus tending to normally urge the insulation cup 57 and element 56 downward.

A limit stop screw 61 is threaded into the lower end of the adjusting screw 49 and the large flat head thereof engages the lower end of the stud 54 and limits the downward movement of the insulation cup 57 and element 56 relative to the adjusting screw.

A pair of plug-in points 62 are located through one side of the insulation shell 12 and through a plug guard 63 connected to said shell and an electric lead 64 connects one of said plug-in points with the terminal 42. A lead 65 connects the other plug-in point 62 with the binding screws or bolts 46 and 47.

For the purpose of holding the water reservoir or receptacle 13 and the heating unit from displacement when the device is tilted to pour from the spout 14, a lug 66 may be formed upon the plug guard 63 and adapted to be seated beneath the lug 67 formed upon the handle 15.

The heating means as shown in Fig. 1 is set for water which is high in mineral content as found in such localities as Chicago, Pittsburgh and Wheeling. When substantially pure water such as that in Greensburg, Pennsylvania; Flint, Michigan and similar localities is to be used in the device, the adjusting screw 49 is operated to draw the insulation cup 57 and lower element 56 up to the broken line position shown in Fig. 1. This brings the two elements 45 and 56 much closer together, which causes the more pure water to heat as rapidly as required.

It should be noted that at the lowest adjustment of the element 56, as shown in full lines in Fig. 1, the rim of the Bakelite cup 57 extends a trifle above the bottom of the upper element 45, thus permitting the water to completely fill the space between the two electrodes before it overflows over the rim of the cup 57.

In operating the improved drip coffee maker to make coffee, the desired amount of ground coffee is placed in position in the basket 16, which is suspended within the upper open end of the pot 10, the heating unit is positioned above the coffee basket with the water reservoir mounted thereon as shown, and the plug-in points 62 are connected to an electric circuit as by the ordinary attachment plug. The lid 22 is removed from the water reservoir and the proper amount of cold water is poured through the perforate guard plate 17 into the water reservoir, the lid being then placed in position thereon as shown in Fig. 1.

The water immediately starts to flow through the hollow adjusting screw and out through the transverse port 53, filling the insulation cup 57 and closing the circuit between the elements 45 and 56, through the water contacting therewith. The water is rapidly heated to the desired temperature and flows over the rim of the insulation cup 57 onto the spreader plate 29 where it is distributed, by means of the spaced apertures therein, over the ground coffee in the coffee basket, passing through the same and dripping through the perforated bottom of the coffee basket into the pot 10. This action continues until all of the water has flowed from the water reservoir through the heating unit and then through the ground coffee after being heated to the proper temperature.

In Fig. 5 is illustrated a modified form of heating unit especially adapted for more rapidly heating substantially pure water. This form of heating unit is very similar to that illustrated in Fig. 1 and above described excepting that there are three elements instead of two as shown in Fig. 1.

The upper element 45a is stationary relative to the inverted cup portion 28a of the insulation shell 12a but, instead of being insulated from the hollow stud 35a, is electrically connected thereto so that it is electrically connected through the hollow stud 39a and terminal 42a with the lead 64a connected to one of the plug-in points 62a. The central element 45b is insulated from the stud 35a by the insulation bushing 43a and from the upper element 45a by means of the insulation bushings 68 surrounding the binding screws or bolts 47a, both of which may be connected by a lead, as above described, to the other plug-in point 62a.

The lower element 56a is electrically connected to the stud 35a through the adjusting screw 49a and the insulation cup 57a is carried by said adjusting screw in the manner above described relative to Fig. 1. Thus, the upper element 45a and lower element 56a are in one side of the circuit while the central element 45b is in the other side of the circuit.

With the parts as shown in full lines in Fig. 5, as set for water having a large mineral content, only the lower element 56a and middle element 45b are used, since the rim edge of the insulation cup 57a does not extend above the top of the middle element 45b. However, if more pure or high resistance water is to be used, the adjusting screw 49a is operated to raise the lower element 56a and insulation cup 57a to the dotted line position shown in Fig. 5, making a very close adjustment between the lower and middle elements and raising the rim edge of the insulation cup 57a above the bottom of the upper element 45 so that this upper element is also brought into the circuit. This permits the water to be very rapidly heated between the upper and middle elements, as well as between the lower and middle elements. Just twice the amount of heating surface of the elements is thus made available and in order to facilitate the passage of the water between the elements, apertures 69 may be formed through the middle element. With this adjustment, the water may be heated much more rapidly or to a higher temperature.

In Fig. 6 is shown a modification in which the pot 10b is provided at its rim edge, adjacent to the handle 15b, with a notch 70 to receive the plug guard 63b so that the entire heating unit may be submerged within the pot 10b and hidden from view.

Although the invention is illustrated and described as for use in connection with an automatic electric drip coffee maker, it should be understood that the heating elements disclosed and claimed herein are capable of use upon various other utensils in the manner disclosed in my copending application, for Automatic electric cooking utensils, Serial No. 741,811.

I claim:

1. A drip coffee maker including a water reservoir having an outlet port, an electric heating unit beneath the water reservoir and comprising two spaced elements in opposite sides of an electric circuit, an insulation cup in which one element is located, the cup being adjustable relative to the other element, means for adjusting the position of the cup to change the relative positions of said elements, and a ground coffee basket beneath said heating unit.

2. A drip coffee maker including a water reservoir having an outlet port, an electric heating unit beneath the water reservoir and comprising two spaced elements in opposite sides of an electric circuit, an insulation cup surrounding said elements, one element being fixed to the cup, means for adjusting the position of the cup to change the relative positions of said elements, and a ground coffee basket beneath said heating unit.

3. A drip coffee maker including a water reservoir having an outlet port, an electric heating unit beneath the water reservoir and comprising two spaced elements in opposite sides of an electric circuit, an insulation cup surrounding said elements, one element being supported above and extending into the cup, the other element being mounted upon the bottom of the cup, means for adjusting the position of the cup to change the relative positions of said elements, and a ground coffee basket beneath said heating unit.

4. A drip coffee maker including a water reservoir having an outlet port, an electric heating unit beneath the water reservoir and comprising upper and lower spaced elements in opposite sides of an electric circuit, an insulation cup in which the lower element is mounted, the upper element being supported above and extending into the cup and having a port therethrough communicating with said outlet port, means for adjusting the position of the cup to change the relative positions of said elements, and a ground coffee basket beneath said heating unit.

5. A drip coffee maker including a water reservoir having an outlet port, an electric heating unit beneath the water reservoir and comprising two spaced elements in opposite sides of an electric circuit, a perforate spreader plate beneath the heating unit having a steam pressure relief port therein surrounded by a raised projection, and a ground coffee basket beneath said spreader plate.

6. A drip coffee maker including a water reservoir having an outlet port, an electric heating unit beneath the water reservoir and comprising two spaced elements in opposite sides of an electric circuit, means for adjusting the relative positions of said elements, a perforate spreader plate beneath the heating unit having a steam pressure relief port therein surrounded by a raised projection, and a ground coffee basket beneath said spreader plate.

7. An electric unit for heating water including an insulation cup, an element in said cup and located in one side of an electric circuit, an element extending into the cup spaced from the first named element and located in the other side of the electric circuit, means for flowing water into the cup and around the elements to close the circuit, and means for adjusting the position of the cup to change the relative positions of said elements.

8. An electric unit for heating water including an insulation cup, an element in said cup and located in one side of an electric circuit, an element extending into the cup spaced from the first named element and located in the other side of the electric circuit, the second named element having a port for flowing water into the cup and around the elements to close the circuit, and means for adjusting the position of the cup to change the relative positions of said elements.

9. An electric unit for heating water including a cup, an element in the bottom of the cup and located in one side of an electric circuit, a second element extending into the cup spaced from the first element and located in the other side of the electric circuit, a third element above the second element and located in the same side of the circuit as the first named element, means for flowing water into the cup and around the elements, and means for adjusting the cup and first named element relative to the other two elements so as to located the third named element within or outside of the cup.

10. A drip coffee maker including a water reservoir having an outlet port, an electric heating unit beneath the reservoir and comprising two spaced elements in opposite sides of an electric circuit, a ground coffee basket beneath said heating unit, and a perforate guard plate in the upper end of the water reservoir.

11. An electric unit for heating water including an insulation shell, a stationary element in the upper portion of the shell and located in one side of an electric circuit, an adjusting screw located through the top of the shell and through said element, a cup carried by said adjusting screw and adapted to be raised and lowered relative to said element, and a second element carried in said cup and located in the other side of the circuit, there being a port leading from the upper end of the adjusting screw to a point between said elements to flow water into the cup and around the elements.

12. In combination with a utensil having an open upper end, an electric heating unit suspended within the open upper end of the utensil and having a plug guard extending outwardly at one side thereof, a horizontally disposed, outwardly extending lug upon said plug guard, a handle upon the utensil, and a horizontally disposed, inwardly extending lug upon said handle adapted to horizontally, slidably engage over the lug on the plug guard.

13. A drip coffee maker having a reservoir, a coffee basket and a coffee receptacle, immersed electrodes for heating the water as it flows from the reservoir to the receptacle, an insulation cup in which one of the elements is mounted, and means for changing the position of the cup for regulating the relation of the electrodes with respect to each other to componsate for variations in the conductivity of the water.

14. An immersed electrode type of heater for drip coffee makers, which coffee makers comprise an upper reservoir and a lower receptacle with a coffee basket in the top thereof, said heater comprising an insulation ring adapted to be fitted between the top of the receptacle and the base of the reservoir, spaced electrodes supported inside the ring, and a cup supported within the ring below and surrounding the electrodes for receiving water discharged from the reservoir.

15. In a coffee pot for making drip coffee, a water reservoir, a receptacle for the brewed beverage below said reservoir, a perforated basket for the ground coffee, intermediate said reservoir and said beverage receptacle, a heating chamber for the water interposed between said reservoir and said coffee basket, a passage for water from said reservoir to said heating chamber, spaced complemental electrodes housed within said heating chamber and defining a passageway for the water through said heating chamber to the coffee basket, means operable to regulate the space between said electrodes, and an electrical circuit connected to said electrodes for heating the water between the electrodes by the electric resistance.

16. In a coffee pot for making drip coffee, a water reservoir, a receptacle for the brewed beverage below said reservoir, a perforated basket for the ground coffee intermediate said reservoir and said beverage receptacle, a heating chamber for the water interposed between said reservoir and said coffee basket, a passage for water from said reservoir to said heating chamber, spaced complemental electrodes housed within said heating chamber and defining a passageway for the water through said heating chamber to the coffee basket, an electrical circuit connected to said electrodes for heating the water as it flows therebtween, and means for adjusting the distance between said electrodes whereby the size of the passageway therebetween may be altered.

17. In a coffee pot for making drip coffee, a water reservoir, a receptacle for the brewed beverage below said reservoir, a perforated basket for the ground coffee intermediate said reservoir and said beverage receptacle, a heating chamber for the water interposed between said reservoir and said coffee basket, said heating chamber being defined by a top, a perforated bottom, and a side wall, an electrode suspended from the top and interiorly of said heating chamber, a second electrode disposed at a spaced distance below said first mentioned electrode by an adjustable supporting member received by the bottom of said heating chamber, an electrical circuit connected to said electrodes for heating the water, means providing a passage for the water from said reservoir to said coffee basket, through said heating chamber and in contact with said electrodes whereby the water will be heated by electric resistance prior to its introduction into the coffee basket.

18. In a coffee pot for making drip coffee, a water reservoir, a receptacle for the brewed beverage below said reservoir, a perforated basket for the ground coffee intermediate said reservoir and said beverage receptacle, a heating chamber for the water interposed between said reservoir and said coffee basket, said heating chamber being defined by a top, a perforated bottom, and a side wall, an electrode suspended from the top and interiorly of said heating chamber, a second electrode disposed at a spaced distance below said first mentioned heating element in face-to-face relation thereto by a supporting element received by the bottom of said heating chamber, an electrical circuit connected to said electrodes, means providing a passage for water from said reservoir to said coffee basket through said heating chamber and in contact with the adjacent faces of said electrodes, whereby water coursing through said passage will be heated by electric resistance prior to its introduction into the coffee basket, the supporting means of one of said heating elements being vertically adjustable toward the other for altering the vertical dimensions of the passageway between opposed faces.

19. In a coffee pot for making drip coffee, a water reservoir, a receptacle for the brewed beverage below said reservoir, a perforated basket for the ground coffee intermediate said reservoir and said beverage receptacle, a heating chamber for the water interposed between said reservoir and said coffee basket, said heating chamber having a perforated bottom, an electrode suspended from the top and interiorly of said heating chamber, a second electrode disposed in alignment at a spaced distance below said first mentioned electrode by an adjustable supporting member received by the bottom of said heating chamber, a basin of larger area than said lower electrode encircling the latter and having a defining side wall of a height greater than the plane of the space between the two electrodes, an electrical circuit connected to said electrodes for heating the water between said electrodes by electrical resistance, means providing a passage for water from said reservoir to said coffee basket through the space between the electrodes and over the side wall of said basin.

20. In a device of the character described, a receptacle for brewed coffee, a coffee infusion basket positioned directly thereabove, a heating chamber having walls composed of electrically nonconductive material positioned above said infusion basket, a water reservoir positioned above said heating chamber, a pair of electrodes in said heating chamber, said electrodes spaced to provide a water passage therebetween, means for operatively connecting said electrodes in an electrical circuit, means providing a passage from said reservoir to the space between said electrodes, said heating chamber provided with openings for the passage of water to said infusion basket.

21. In a coffee maker and the like, a bottom receptacle, an infusion basket, a water reservoir, a chambered heating section interposed between said reservoir and basket, a tube leading from said reservoir and projecting into said heating section, two spaced electrodes positioned in said heating section, the upper electrode secured to said tube which projects therethrough to provide a passageway from said reservoir to the chamber of said heating section, a basin positioned in said heating section, the side walls of said basin spaced outwardly from said upper electrode and extending upwardly above the lower face thereof, the lower electrode supported by said basin, means operable to vertically move said basin to adjust the space between the electrodes, said heating section provided with openings leading to said infusion basket and means to operatively interpose said electrodes in an electrical circuit.

22. In a coffee maker and the like a bottom receptacle, an infusion basket, a water reservoir and a heating section having a chamber arranged substantially as herein set forth, said heating section composed of electrically nonconductive material, spaced electrodes positioned in said heating chamber and means to operatively interpose said electrodes in an electrical circuit.

23. In a device of the character described, a bottom receptacle, an infusion basket, a water reservoir and a heating unit having a chamber arranged substantially as herein set forth, a tube leading from said reservoir and projecting into said chamber, an upper and lower disk electrode operatively positioned in said chamber, the upper electrode provided with a central opening in which said tube is secured, means operable to vertically move said lower electrode to adjust the space between the electrodes and means to operatively interpose said electrodes in an electrical circuit.

24. A heating unit for coffee making devices of the character described, comprising walls of electrically nonconductive material completely enclosing a heating chamber, spaced electrodes in said chamber, an inlet tube for admitting water to said chamber, said tube secured to and extending through one of said electrodes, means operable to move one of said electrodes to and from the other to adjust the space therebetween and means to operatively interpose said electrodes in an electrical circuit.

ALBERT C. WILCOX.